Sept. 27, 1927.
G. F. MARSHALL ET AL
1,643,819
JUICE EXTRACTOR
Filed Feb. 25. 1925
2 Sheets-Sheet 1
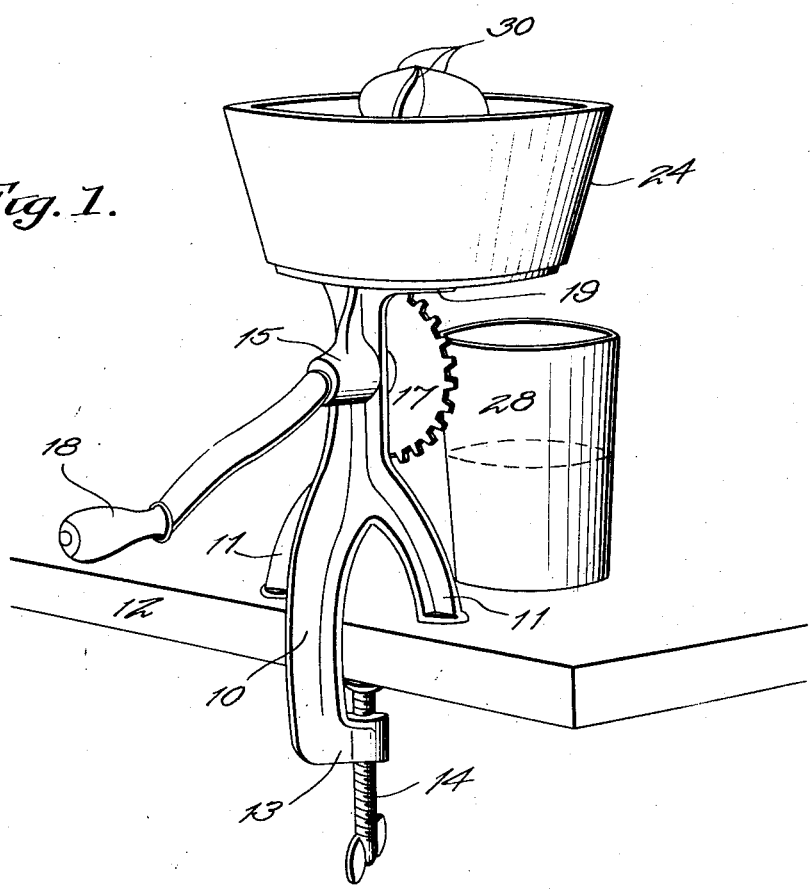
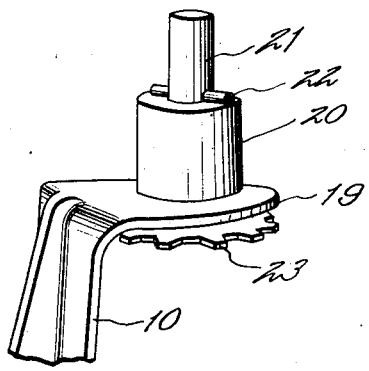
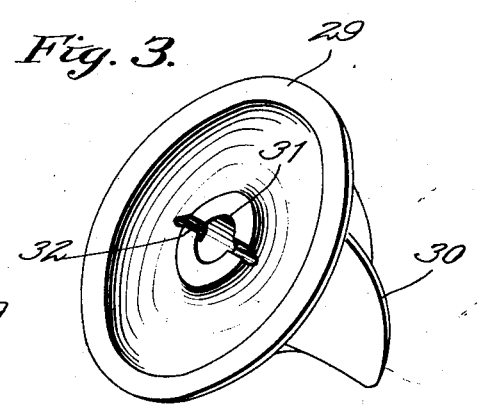
G. F. Marshall
C. W. Vogt
INVENTORS
BY Victor J. Evans
ATTORNEY
WITNESS:

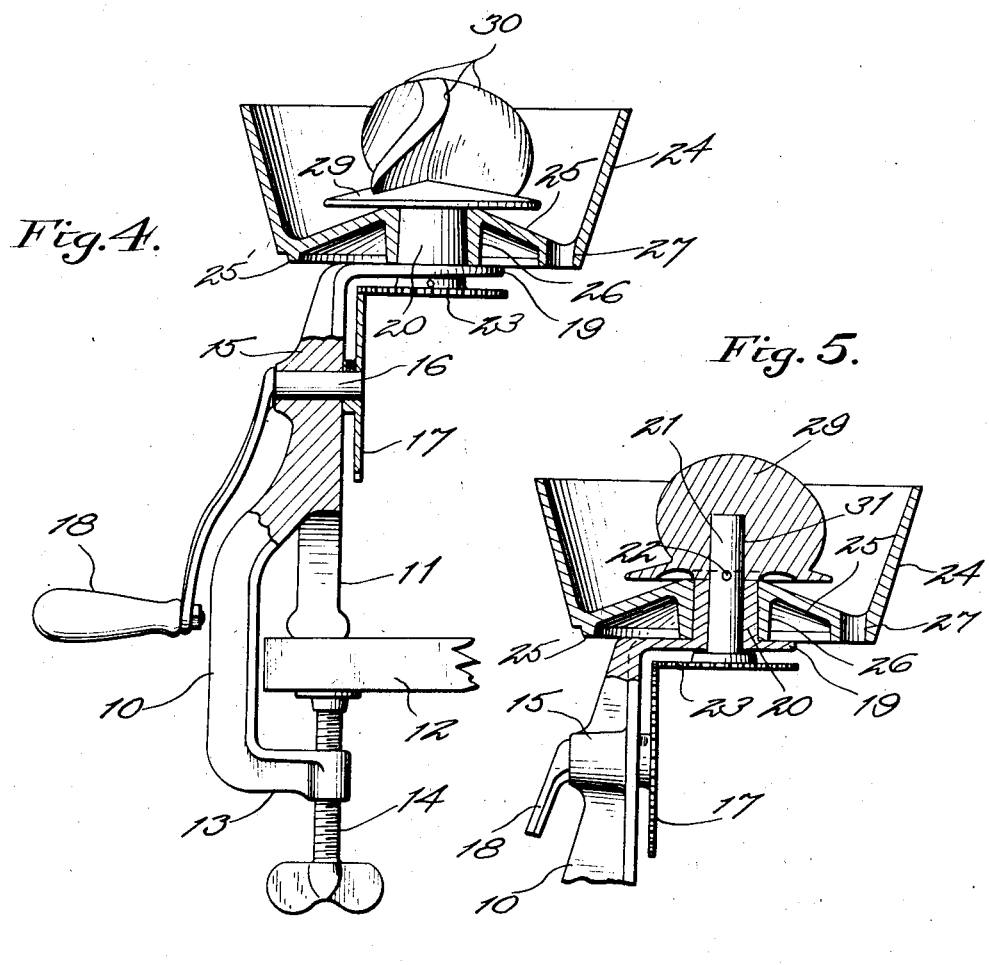

Patented Sept. 27, 1927.

1,643,819

UNITED STATES PATENT OFFICE.

GEORGE F. MARSHALL AND CHARLES W. VOGT, OF TAMPA, FLORIDA.

JUICE EXTRACTOR.

Application filed February 25, 1925. Serial No. 11,592.

This invention relates to juice extractors and contemplates the provision of a novel form of implement which includes gouging means within a suitable receptacle, means for rotating the gouger means within the receptacle whereby the juice from citrus fruit may be drawn from the fruit and drained from the receptacle.

Another object of the invention is that it will extract all of the pulp and juice from oranges, grape fruit, lemons and limes without taking the bitter oils and acids from the skin, and if the orange or the like is pressed on the gouger easily it will crush all the cells in the fruit, and if pressed hard upon the gouger it will gouge out the fruit in pieces for making desserts and puddings.

A further object of the invention is that it may be quickly and easily operated, very easily cleaned owing to the sectional or separable construction of the device, and that it is a household convenience and which may be sold at a price within reach of most housewives.

With the above and other objects in view, the invention further includes the following novel features and details of construction, to be hereinafter more fully described, illustrated in the accompanying drawings, and pointed out in the appended claims.

In the drawings:

Figure 1 is a perspective of the invention attached to a table.

Figure 2 is a sectional perspective of the upper portion of the supporting means with the rotating means journaled therein.

Figure 3 is a perspective of the gouging means.

Figure 4 is a longitudinal section of the invention shown applied to a table.

Figure 5 is a similar view of the gouging means per se.

Figure 6 is a perspective of the receptacle.

Referring to the drawings in detail, wherein like characters of reference denote corresponding parts, the reference character 10 indicates a standard having legs 11 extending downwardly from the upper portion thereof and which are adapted to be flush with the upper side or surface of a table or the like 12, the lower portion of the standard 10 includes an inwardly extending offset portion 13 which has threaded therein an adjusting screw 14 which is adapted to engage the lower side of the table 12 in order that the standard 10 may be held vertically or securely to the table. An enlarged transversely forward portion 15 is provided in the standard 10 above the legs 11 and has journaled therein a correspondingly extending shaft member 16 which includes a gear 17 and handle 18 upon the opposite end portions thereof. A transversely disposed platform portion 19 is provided upon the upper portion of the standard 10 and extends directly over the gear 17 and in spaced relation thereto, formed integral with and extending vertically of is a bearing member 20.

Mounted for vertical rotary movement within a bearing member 20 is a driven shaft 21 which extends an appreciable distance above the upper periphery of the bearing member 20 and includes a transversely extending pin member 22 therein which engages and rotates upon the upper side of the bearing member 20; fixed to the opposite end portion of the driven shaft 21 is a gear 23 which meshes with the gear member 17 and connected with the driving shaft 16.

A receptacle member 24 including a raised bottom portion 25 and a vertically disposed apertured sleeve portion 26 extending from the vertical center of the raised bottom 25 and which snugly receives therein the bearing member 20, this receptacle member 24 further includes an elongated opening 27 adjacent to the lower edge thereof from which the citrus fruit juice is drained into a suitable receptacle as indicated at 28 Figure 1 of the drawings.

The bowl or receptacle 24 further includes an annular flange 25' upon the underside and which projects downwardly as far as the elongated opening 27 and the sleeve portion 26 in order that the bowl per se may sit flat and upright upon a table or the like with less susceptibility of the same from tilting or falling over and breaking.

A gouger member 29 having a plurality of helically pitched blade members 30 upon the upper sides thereof and which are shaped so as to cut and extract all of the juice from the citrus cells of the fruit and without gouging within the skins of the fruit in order that the bitter oils and acids may not be mixed with the juice within the container or receptacle 24. The lower side of the gouger member 29 includes a socket 31 and into which the upper end portion of the driven shaft 21 is received. Positioned at diametrically opposite sides of the bracket 31 formed in the lower side of the gouger member 29 is a pair of elongated slot members 32 which receive the transversely extending pin member 22 therein whereby the gouger member 29 will be simultaneously driven with the driven shaft 21.

It will thus be seen that upon the rotations of the driving shaft 16 by the turnings upon the handle member 18 that the gears 17 and 23 will be rotated and turn the gouging member 29 within the receptacle 24 whereby split or halved fruit may be placed and held against the helically pitched blade 30 upon the upper side of the gouging member 29 whereby the juice and cells of the fruit may be withdrawn from the hull or skin of the fruit and passed through the elongated opening in the lower side of the receptacle 24 and drain into the auxiliary receptacle 28 placed directly thereunder and the juice may readily and easily be withdrawn from the fruit at a maximum rate of speed without removing the receptacle and emptying the same after gouging each piece of fruit.

It is also to be noted that owing to the peculiar shape of the helically pitched cutting blade 30 upon the upper side of the gouging member 29 that all fruits may be placed on this member without boring or gouging the rind, hulls or the like of the fruits whereby the bitter oils and acids will not be withdrawn from the skins of the fruit.

The invention is susceptible of various changes in its form, proportions and minor details of construction, and the right is herein reserved to make such changes as properly fall within the scope of the appended claims.

Having described our invention what is claimed is:

1. A juice extractor comprising a rotatable standard extended through a bearing sleeve, a pin extended through the standard and engageable with the adjacent end of the sleeve, a gouging member provided with a socket portion receiving the standard, said member is further provided with elongated slots located at diametrically opposite sides of the socket opening to receive portions of the pin, and a receptacle carried by the sleeve.

2. A juice extractor comprising a rotatable standard extended through a bearing, a pin extended through the standard and engageable with the adjacent end of the sleeve, a receptacle provided with a centrally raised bottom communicating with an opening therein, a sleeve depending from the receptacle bottom adjacent the opening and receiving said bearing, and a gouging member carried by the standard within the receptacle.

In testimony whereof we affix our signatures.

GEORGE F. MARSHALL.
CHARLES W. VOGT.